United States Patent [19]

Busch

[11] Patent Number: 5,026,956
[45] Date of Patent: Jun. 25, 1991

[54] INDUCTIVELY HEATED RING PULLER

[75] Inventor: Dieter Busch, Ismaning, Fed. Rep. of Germany

[73] Assignee: Prüftechnik Dieter Busch & Partner GmbH & Co., Ismaning, Fed. Rep. of Germany

[21] Appl. No.: 187,519

[22] PCT Filed: Jul. 20, 1987

[86] PCT No.: PCT/EP87/00394

§ 371 Date: Mar. 29, 1988

§ 102(e) Date: Mar. 29, 1988

[87] PCT Pub. No.: WO88/00873

PCT Pub. Date: Feb. 11, 1988

[30] Foreign Application Priority Data

Jul. 29, 1986 [DE] Fed. Rep. of Germany ....... 3625658

[51] Int. Cl.$^5$ ............................................. H05B 6/14
[52] U.S. Cl. .......................... 219/10.491; 219/10.57; 219/10.75; 219/10.79; 29/244
[58] Field of Search ............ 219/10.491, 10.65, 10.57, 219/10.79, 10.75, 535, 10.73; 29/244, 268

[56] References Cited

U.S. PATENT DOCUMENTS

| 1,607,675 | 11/1926 | Jefferies . | |
|---|---|---|---|
| 1,636,448 | 7/1927 | Whipple | 29/268 |
| 2,610,287 | 9/1952 | Robson | 219/10.491 |
| 2,933,584 | 4/1960 | Thielsch | 219/10.491 |
| 4,529,869 | 7/1985 | Ekstrom, Jr. | 219/535 |

FOREIGN PATENT DOCUMENTS

| 350941 | 1/1905 | France . |
| 2352638 | 12/1977 | France . |
| 922700 | 1/1955 | German Democratic Rep. . |
| 1057415 | 5/1959 | German Democratic Rep. . |
| 1088887 | 9/1960 | German Democratic Rep. . |
| 663136 | 5/1979 | U.S.S.R. . |

OTHER PUBLICATIONS

Die Kugellager Zeitschrift, vol. 40, Nr. 146, 1965, (Veenendaal), (NL), "Neues Abziehwerkzeug für Innenringe von Zylinderrollenlagern", pp. 11 and 12.

Primary Examiner—Philip H. Leung
Attorney, Agent, or Firm—Robert W. Fiddler

[57] ABSTRACT

A rig puller for removing rings from shafts to which they are affixed. The puller is formed by a steel heat accumulator ring having a slot separating the ring into a band having separated ends. An electrical conductor extends between the ring ends, and a clamping device is provided to force the ring ends towards each other about a ring to be removed. By utilizing steel which as compared to most metals and more particularly aluminum has relatively low specific heat and thermal conductivity, the ring may be efficiently heated inductively and used immediately to effect expansion of the ring to be removed without requiring cleaning where the accumulator ring had been heated in an oil bath or the like as previously.

10 Claims, 2 Drawing Sheets

INDUCTIVELY HEATED RING PULLER

This invention relates to an apparatus for removing rings from shafts on which the rings are mounted, and more particularly to an improved heat accumulator, the heat of which can be transfered to the ring to be removed to expand same and free it from the shaft on which it is mounted.

Heat accumulators have been previously employed to heat the inner race ring of an antifriction bearing which is secured on a shaft in order to cause thermal expansion of the ring so that it may be easily pulled off the shaft.

Heat accumulators of this type are well known. The action of the force is exerted by means of a special-purpose clamping device which contracts it to a smaller diameter.

Such prior art heat accumulators have been heated by being exposed to the direct thermal action of a source of heat. Unlike the heating up of antifriction bearings prior to mounting them on a shaft it is necessary for heat accumulators to be heated to a substantially higher temperature than the antifriction bearings to that after clamping onto the ring to be pulled off they are still able to transfer a sufficient quantity of heat to the latter. One fraction of the stored heat is lost during the time between detaching the heat accumulator from the source of heat and firmly attaching the heat accumulator to the ring is to be removed, and another fraction of the stored heat remains in the heat accumulator, since the latter only transfers heat to the ring to be removed until there is a temperature equilibrium.

In the past the sources of heat have been oil baths and burners. Oil baths are inconvenient to handle and leave an oil film which has to be removed at least partially before clamping the heat accumulator on the ring to be removed and heating by means of a burner gives rise to problems as regards reaching a precise working temperature.

Resistance heating using a welding transformer or the like hardly comes into question owing to the unavoidable local overheating at the electrode contact points due to the accompanying risk of damage to the heat accumulator.

SUMMARY OF THE INVENTION

It is with the above problems in mind that the present improved ring puller has been developed. The instant ring puller is formed of steel which as compared to aluminum has a relatively low specific heat and thermal conductivity, whereby it may be inductively heated with great efficiency. The steel ring is transversely slotted and a conductor is extended accross the slot. A clamp is provided to bring the slotted ring ends together. In use, the ring puller is inductively heated and arranged in heat exchange relationship with the ring to be removed so that the heat of the ring pulled may be transferred to the ring to be removed to expand and free same from the shaft on which it is mounted.

BRIEF DESCRIPTION OF DRAWINGS

The invention will now be explained in detail with reference to two working embodiments thereof, as illustrated in the accompanying drawings, wherein.

DESCRIPTION OF PREFERRED EMBODIMENT

Figure 1:
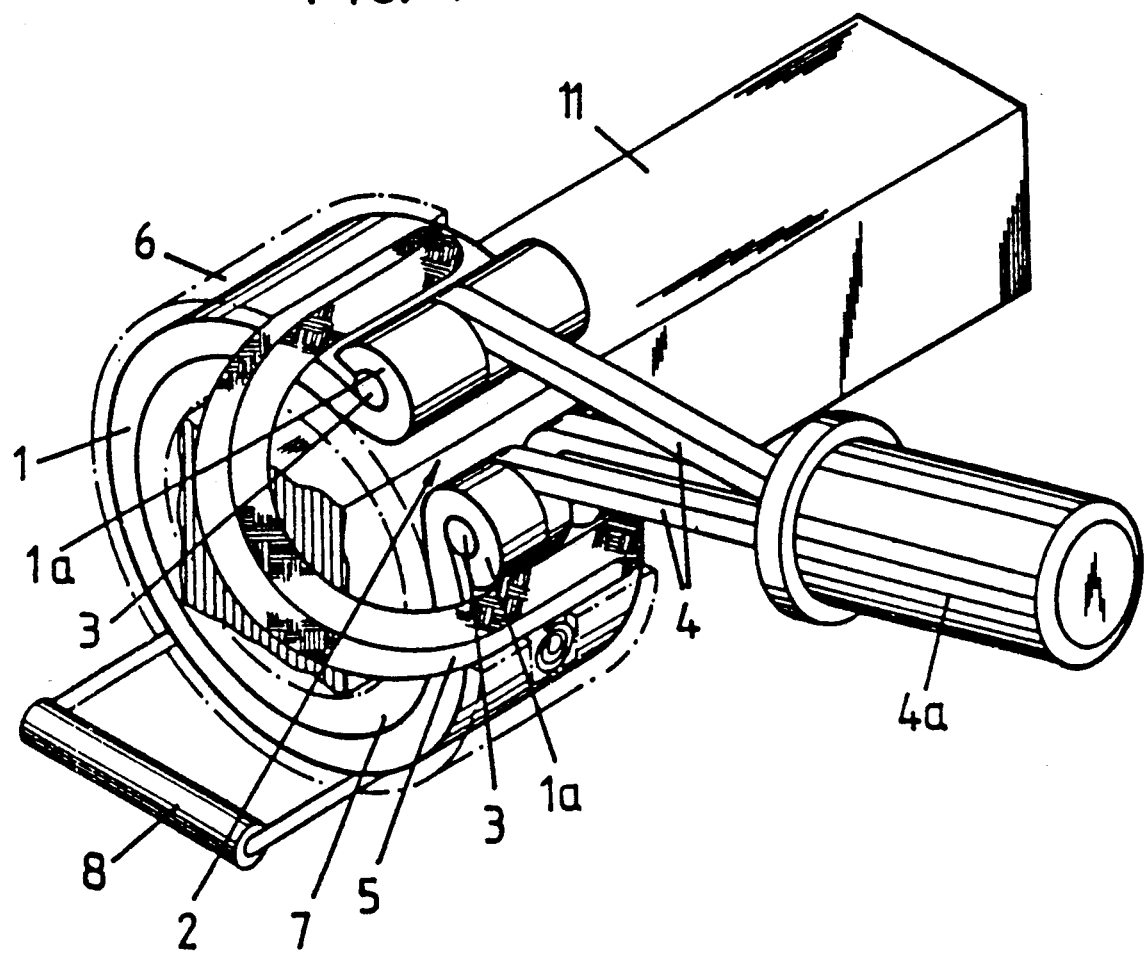
FIG. 1 shows a first working example of the heat accumulator in accordance with the invention in perspective to indicate the built-in clamping device and of the handle for transport and handling and also showing the part carrying the magnetic alternating flux as part of the device for inductive heating, on which the heat accumulator is placed.

The heat accumulator as shown in FIG. 1 consists of a steel ring 1 with a continuous transverse slot 2, the ends of the steel ring adjacent to the slot 2 being formed as eyes 1a which surround pins 3 to which the clamping device 4 is applied. The latter makes it possible to contract the ring by pressing down the handle 4a out of the position shown in FIG. 1 so that the ring 1 then has a smaller diameter. This operation is undertaken only after the heating up of the steel ring 1 to the working temperature on site.

The free ends of the steel ring 1 are electrically connected with each other via a conductor 5 with a high electrical conductivity in the form of copper braid like the ground conductors used in motor vehicles, bridging over the slot 2. The connection 5 is contoured in such a manner that it does not impede the handling and contraction of the steel ring 1 of the clamping device 4.

On the outside and around its periphery the steel ring 1 is provided with a layer 6 of heat insulating material to prevent an excessive loss of heat from the heated ring 1 as it is moved to the site of application and until its secured on the ring to be pulled off. The periphery of the steel ring 1 is also temporarily covered even during the process of heating with a further layer of 7 of heat insulating material, which also prevents an excessive loss of heat from the steel ring 1 but which is removed before the steel ring 1 is mounted on the ring to be pulled off, since it would prevent the production of a full, heat-conducting contact between the steel ring 1 and the ring to be removed.

A handle 8 is fixed to the steel ring 1 with which the heat accumulator consisting of the above mentioned parts may be transported and handled. The steel ring 1 makes thermal contact with a contact area 9 on a mushroom-like structure 10 of steel, which extends from the steel ring 1. The stem 10a of the mushroom-like structure 10 has a comparatively small cross section and thus forms a thermal resistance which limits the flow of heat to the contact area 9 to values which are substantially under the respective temperature of the steel ring 1 but which however lead to a temperature, proportional to the latter, at the contact area 9 with a cross sectional area greater than the cross section of the stem 10a. The ferromagnetic material of the structure 10 makes it possible to use magnetic self adhesive temperature sensors. For the production of a good thermal contact between the sensor and the contact area 9 the latter is covered with a soft, snugly fitting material with a good thermal conductivity.

To heat up the steel ring 1 the latter is pushed on the transverse yoke, 11, see FIG. 1, of a core carrying the alternating magnetic flux, in which the magnetic flux is produced in a conventional manner using a winding conducting alternating current. The magnetic flux induces an eddy current in the steel ring 1, which owing to the connection of its ends by means by the connecting line 5 is to be regarded as a closed winding with one turn. This eddy current heats the steel ring 1 until the working temperature has been attained, this being under the control of the temperature sensor placed on the contact area 9. The heat accumulator is then charged and ready to be moved to the application site. with the aid of the temperature monitoring at the contact surface 9 it is then possible for the temperature to be kept at a given value until the heat accumulator is needed.

Figure 3:
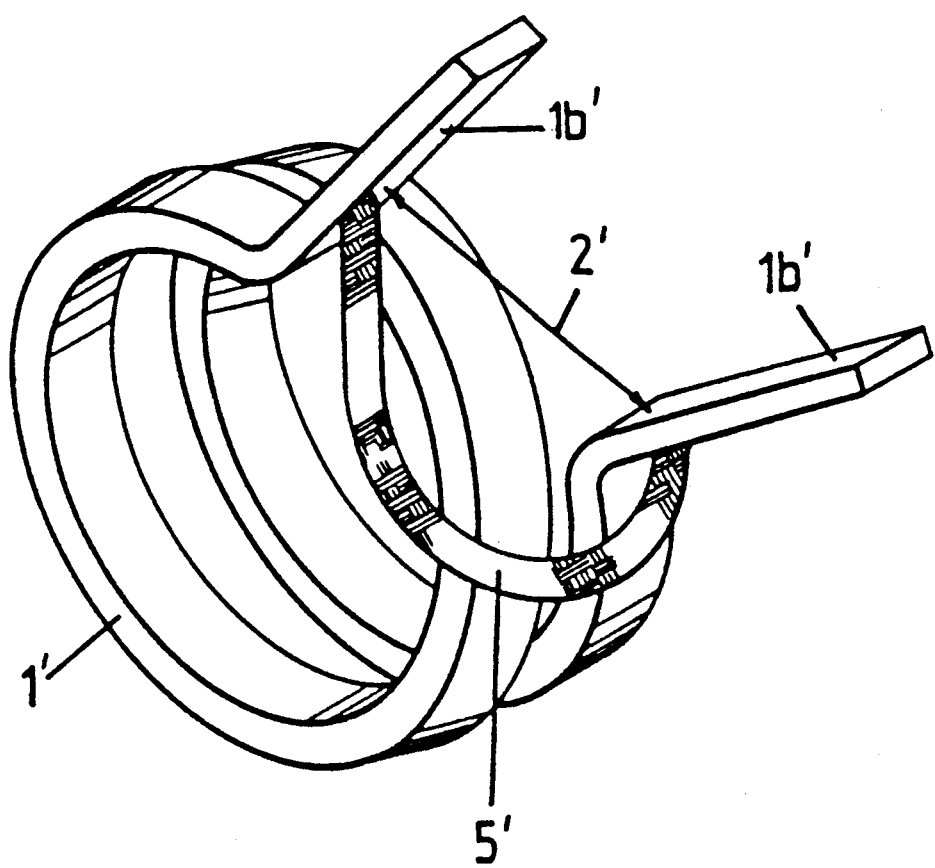
FIG. 3 is a perspective view of a second form of the heat accumulator.

The design of the heat accumulator as shown in FIG. 3, of which only the helical steel ring 1' is shown with its connecting line 5', differs from that of FIG. 1 essentially only in that the steel ring 1 with the connecting line 5', which just as in the design of FIG. 1 is permanently connected with the steel ring 1', forms a closed winding with two turns, this giving a favorable effect as regards current loading. The bent ends 1b of the steel ring 1' make possible the use of a tongslike clamping device to draw together the steel ring 1', which in the present case in particularly elastic, so that its diameter is decreased.

Figure 2:
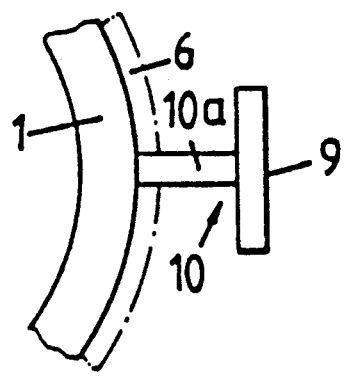
FIG. 2 shows the contact area for mounting a temperature sensor together with the adjacent part of the heat accumulator as seen from the side.

In the case of the embodiment of FIG. 3 as well it is obviously possible to use layers of thermally insulating material on the peripheral outer surface and on the peripheral inner surface for the same purpose as in connection with the design as described in FIG. 1. It is also possible to provide a contact area as in FIG. 2 for instance.

As a matter of principle it possible for the radial surfaces of the steel rings 1 and 1' to be covered with a thermal insulating material but however this measure only leads to a reduced effect and is more difficult to implement owing to the radial faces which are small as compared with the peripheral surfaces.

I claim:

1. A ring puller for removing rings from a shaft on which they are mounted, said ring puller comprising a heat accumulator ring formed of steel; a transverse slot extending across the ring to separate the ring into a band with separated ends; a clamping device coupled to the accumulator ring to permit the separated ring ends to be brought together; and an electrical conductor extending between the ring ends, said steel accumulator ring characterized in that as compared to aluminum it has a relatively low specific heat and thermal conductivity, whereby it may be efficiently inductively heated.

2. A ring puller as in claim 1 in which said electrical conductor is securely fixed to said accumulator ring.

3. A ring puller as in claim 1 in which said conductor comprises a copper braid.

4. A ring puller as in claim 1 in which said accumulator ring has a layer of thermally insulated material covering its peripheral surface.

5. A ring puller as in claim 4 in which said insulating material extends over the ends of said accumulator ring.

6. A ring puller as in claim 4 in which a layer of insulating material is removably attached on the inner surface of said accumulator ring.

7. A ring puller as in claim 11 in which a heat transmitting contact area is formed on said ring.

8. A ring puller as in claim 7 in which said heat transmitting contact area is coupled to said accumulator ring by a thermal resistance bridge which maintains said contact area at a value which is proportional to and less than that of said accumulator ring.

9. A ring puller as in claim 8 in which said contact area is magnetic.

10. A heat accumulator as in claim 7, in which said contact area comprises a soft metal with high thermal conductivity.

* * * * *